US011593811B2

(12) United States Patent
Hanis et al.

(10) Patent No.: US 11,593,811 B2
(45) Date of Patent: *Feb. 28, 2023

(54) FRAUD DETECTION BASED ON COMMUNITY CHANGE ANALYSIS USING A MACHINE LEARNING MODEL

(71) Applicant: INTERNATIONAL BUSINESS MACHINES CORPORATION, Armonk, NY (US)

(72) Inventors: Thomas T. Hanis, Raleigh, NC (US); Subhendu Das, Chapel Hill, NC (US); Shanna Hayes, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 16/267,515

(22) Filed: Feb. 5, 2019

(65) Prior Publication Data
US 2020/0250675 A1 Aug. 6, 2020

(51) Int. Cl.
G06Q 20/40 (2012.01)
G06K 9/62 (2022.01)
G06N 20/00 (2019.01)

(52) U.S. Cl.
CPC ....... *G06Q 20/4016* (2013.01); *G06K 9/6256* (2013.01); *G06N 20/00* (2019.01)

(58) Field of Classification Search
CPC ... G06Q 20/4016; G06N 20/00; G06K 9/6256
(Continued)

(56) References Cited

U.S. PATENT DOCUMENTS 6,094,643 A 7/2000 Anderson et al.
7,610,216 B1 10/2009 May et al.
(Continued)

FOREIGN PATENT DOCUMENTS

WO WO 2000/068860 A2 * 5/1999
WO WO-2014145395 A2 * 9/2014 ........... G06Q 20/384

OTHER PUBLICATIONS

Camino et al., "Finding Suspicious Activities in Financial Transactions and Distributed Ledgers," 2017 IEEE International Conference on Data Mining Workshops (ICDMW), 2017, pp. 787-796. (Year: 2017).*
(Continued)

*Primary Examiner* — Hani M Kazimi
*Assistant Examiner* — Alison L. Lamb
(74) *Attorney, Agent, or Firm* — Conley Rose. P.C.

(57) ABSTRACT

The disclosed embodiments include a method for performing financial fraud assessment that includes creating a machine learning model based on features used to identify financial fraud risk; receiving financial information associated with customer accounts; establishing communities for the customer accounts; creating a baseline set of the features for each of the communities; receiving new financial information associated with customer accounts; updating the communities for the customer accounts based on the new financial information; extracting an updated set of the features for each of the communities; and determining a difference between the baseline set of the features and the updated set of the features for each of the communities; and using the machine learning model to determine financial fraud risk for each of the communities based on the difference between the baseline set of the features and the updated set of the features for each of the communities.

20 Claims, 4 Drawing Sheets

(58) Field of Classification Search
USPC .......................................................... 705/44
See application file for complete search history.

(56) References Cited

U.S. PATENT DOCUMENTS

| | | | |
|---|---|---|---|
| 7,693,810 B2* | 4/2010 | Donoho | G06Q 40/00 |
| | | | 706/48 |
| 8,290,838 B1 | 10/2012 | Thakur et al. | |
| 8,600,872 B1* | 12/2013 | Yan | G06Q 40/00 |
| | | | 705/38 |
| 10,325,224 B1* | 6/2019 | Erenrich | G06N 20/00 |
| 2003/0097320 A1 | 5/2003 | Gordon | |
| 2003/0182214 A1 | 9/2003 | Taylor | |
| 2007/0192240 A1 | 8/2007 | Crooks | |
| 2008/0270303 A1 | 10/2008 | Zhou et al. | |
| 2009/0099884 A1 | 4/2009 | Hoefelmeyer et al. | |
| 2012/0259753 A1 | 10/2012 | Orad et al. | |
| 2013/0024376 A1 | 1/2013 | Choudhuri et al. | |
| 2013/0332338 A1* | 12/2013 | Yan | G06Q 10/067 |
| | | | 705/38 |
| 2014/0058763 A1* | 2/2014 | Zizzamia | G06Q 50/22 |
| | | | 705/4 |
| 2015/0154600 A1* | 6/2015 | Diehl | G06Q 20/4016 |
| | | | 705/39 |
| 2017/0053294 A1 | 2/2017 | Yang et al. | |
| 2018/0053188 A1 | 2/2018 | Zoldi et al. | |
| 2018/0218369 A1* | 8/2018 | Xiao | G06Q 20/20 |
| 2018/0365696 A1* | 12/2018 | Yan | H04L 63/1425 |
| 2018/0374098 A1* | 12/2018 | Zhang | G06N 20/20 |
| 2019/0259033 A1* | 8/2019 | Reddy | G06N 3/08 |

OTHER PUBLICATIONS

"List of IBM Patents or Patent Applications Treated as Related," Feb. 5, 2019, 2 pages.

Office Action dated Jul. 28, 2020, U.S. Appl. No. 16/267,515, filed Feb. 5, 2019, 31 pages.

Camino, et al., "Finding Suspicious Activities in Financial Transactions and Distributed Ledgers, 2017, 2017 IEEE International Conference on Data Mining Workshops," 787-796, (Year: 2017).

Office Action dated Dec. 9, 2020; U.S. Appl. No. 16/267,512, filed Feb. 5, 2019, 33 pages.

Office Action dated Aug. 19, 2021; U.S. Appl. No. 16/267,512, filed Feb. 5, 2019, 28 pages.

Office Action dated Jan. 6, 2022, U.S. Appl. No. 16/267,512, filed Feb. 5, 2019, 24 pages.

* cited by examiner

FRAUD DETECTION BASED ON COMMUNITY CHANGE ANALYSIS USING A MACHINE LEARNING MODEL

BACKGROUND

Financial fraud has long been a major issue for financial services institutions. Financial fraud can include various activities including money laundering, theft, check fraud, ponzi-schemes, and identity fraud. Activities that may be indicative of financial fraud include any financial transaction that does not make sense to the financial institution, is unusual for a particular client, or appears to be done only for the purpose of hiding or obfuscating another, separate transaction. Technology can play a critical role in identifying indicators of fraud.

SUMMARY

The disclosed embodiments include a system, computer program product, and computer-implemented method for performing financial fraud assessment. In an embodiment, the method includes creating a machine learning model based on features used to identify financial fraud risk; receiving financial information associated with customer accounts; establishing communities for the customer accounts; creating a baseline set of the features for each of the communities; receiving new financial information associated with customer accounts; updating the communities for the customer accounts based on the new financial information; extracting an updated set of the features for each of the communities; and determining a difference between the baseline set of the features and the updated set of the features for each of the communities; and using the machine learning model to determine financial fraud risk for each of the communities based on the difference between the baseline set of the features and the updated set of the features for each of the communities.

Other embodiments of this aspect include corresponding computer systems, apparatus, and computer programs recorded on one or more computer storage devices, each configured to perform the actions of the methods.

Other embodiments and advantages of the disclosed embodiments are further described in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

Accordingly, the present disclosure describes various methods, systems, and computer program products that can be utilized to automatically detect fraud by utilizing features associated with specific communities such as, but not limited to, and based on, change, size of change, nature of change, breadth of change, and change in features.

Figure 1:
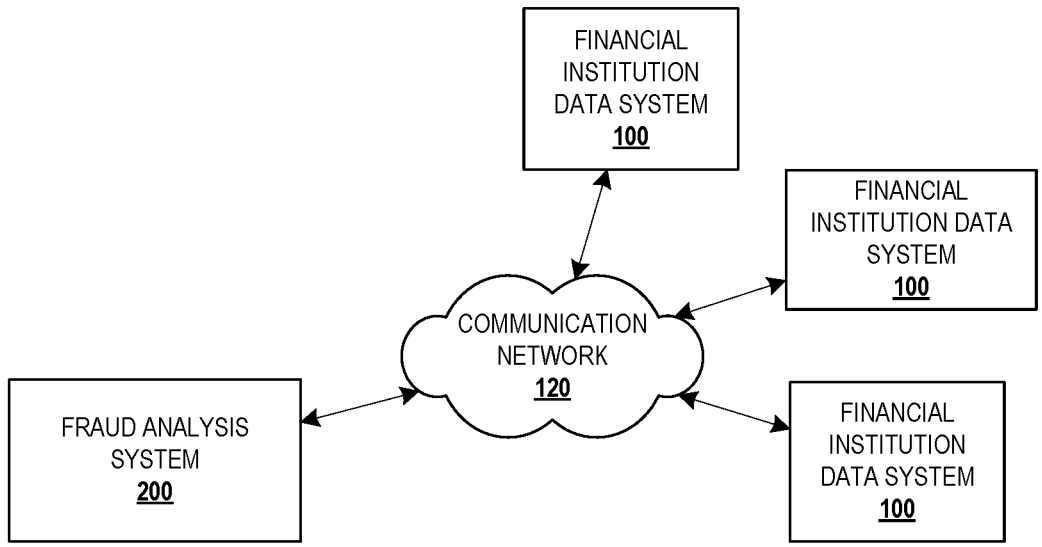
FIG. 1 is a schematic diagram illustrating a network for a fraud analysis system in accordance with an embodiment of the present disclosure.

FIG. 1 is a schematic diagram illustrating a network for a fraud analysis system in accordance with an embodiment of the present disclosure. In the depicted embodiment, a fraud analysis system 200 is configured to communicate with one or more financial institution data system 100. The financial institution data system 100 contains financial information associated with customer accounts for one or more financial institutions. Customer accounts can include checking and savings accounts, money market account, retirement accounts, or any other type of financial accounts. Financial information can include the name or business associated with an account, address information, transactions, balances, any suspicious activity reports (SARs) associated with the account, and any other information relevant to the customer accounts (e.g., average balances, average transaction amounts, average number of transactions per month, etc.).

As used herein, the term "communicate(s)" means capable of sending and/or receiving data over a communication link. The communication link may include both wired and wireless links, and may be a direct link or may comprise of multiple links passing through one or more communication networks 120 or network devices such as, but not limited to, routers, firewalls, servers, and switches. The communication network 120 may be any type of wired or wireless network. The communication network 120 may include private networks and/or public networks such as the Internet.

Additionally, as used herein, the term "communicate(s)" may also encompass internal communications between various components of a system and/or with an external input/output device such as a keyboard or display device.

Figure 2:
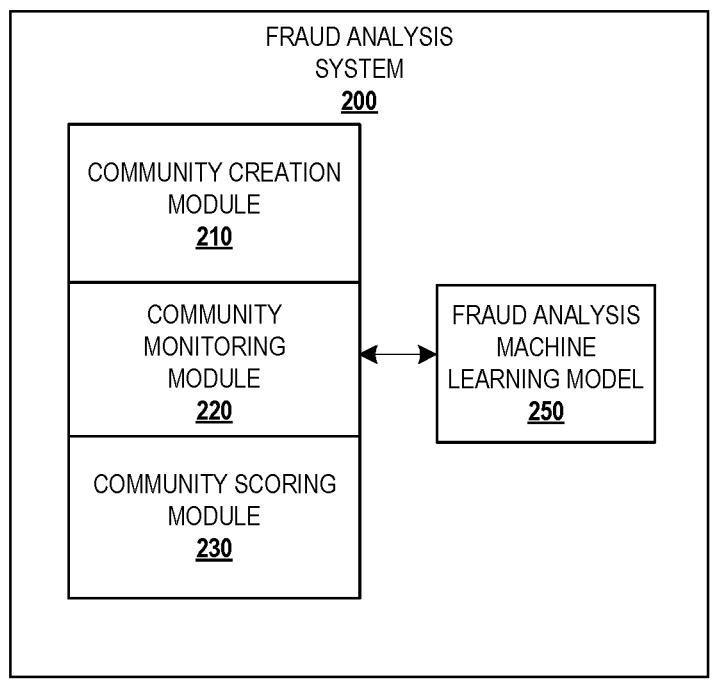
FIG. 2 is a schematic diagram illustrating a fraud analysis system in accordance with an embodiment of the present disclosure.

FIG. 2 is a schematic diagram illustrating various modules of the fraud analysis system 200 in accordance with an embodiment of the present disclosure. A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. Computer executable instructions can be in any form including, but not limited to, machine code, assembly code, and high-level programming code written in any programming language. The module or unit may be configured to use the data to execute one or more instructions to perform one or more tasks. In certain instances, a module may also refer to a particular set of functions, software instructions, or circuitry that is configured to perform a specific task. For example, a module may comprise of software components such as, but not limited to, data access objects, service components, user interface components, application programming interface (API) components; hardware components such as electrical circuitry, processors, and memory; and/or a combination thereof.

In the depicted embodiment, the fraud analysis system 200 includes a community creation module 210, a community monitoring module 220, and a community scoring module 230. A community as referenced herein means a grouping of customer accounts that share common attributes (e.g., accounts between family members, related businesses, accounts having the same addresses, phone numbers, Internet Protocol (IP) address, contact information, etc.) or have transactions that primarily or frequently occur between each other (e.g., dollar amount of transactions, number of transaction, etc.). In an embodiment, a community is created using the community creation module 210. The community creation module 210 can be configured with rules for establishing a community. In some embodiments, the rules are predefined. In other embodiments, the rules can vary for different financial institutions or different set of financial data. In some embodiments, the rules can be set by an administrator of the fraud analysis system 200. As described above, the rules for establishing a community can be based on X number of transactions performed between accounts, frequency of transactions between accounts, total dollar amount of transactions between accounts, and common attributes of customer accounts, accounts associated with one or more SARs, or any other relevant factors. Limits can also be imposed on a size of a community. For example, in some embodiments, a community can be limited to customer accounts that are one, two, or three hops or connections away from a particular customer account.

In an embodiment, the community monitoring module 220 is configured to receive or request financial information and update the financial information associated with each of the communities and/or customer accounts based on any new financial information. In some embodiments, the community monitoring module 220 is configured to receive or request the financial information periodically according to a schedule (e.g., hourly, daily, weekly, monthly, etc.), receive via a continuous stream of data, receive following a request for financial information, or the financial information can be automatically pushed to the fraud analysis system 200 when new financial information is available. In some embodiments, the financial information includes customer accounts that are initially flagged by the financial institution as having suspicious financial activity. For example, in some embodiments, the financial information can include a fraud score generated by a financial institution indicating a potential level fraud associated with a customer account.

In some embodiments, the community scoring module 230 is configured to determine a fraud level score for each of the communities. In an embodiment, the community scoring module 230 creates a baseline set of features for each of the communities based on an initial set of financial data. A feature is data that provides information about the communities. For example, in some embodiments, the baseline set of features can include a community size feature indicating a size of a community (e.g., how many customer accounts are in the community). The baseline set of features can also include a SARs feature indicating a number of customer accounts within each of the communities that are associated with a SAR, date SARS were issued, and how close/far apart the SARs were issued. The baseline set of features can also include a community structure feature. The community structure feature can indicate the number of customer accounts in a community, a main or primary accounts, subaccounts, relationships of transactions between account, etc. The baseline set of features can also include transaction features indicating frequency, total, and/or average number of transactions (per week/month between accounts), total dollar amount of transactions between accounts, average amounts, unusually sized transaction amounts, etc.

When new financial data is receive by the community monitoring module 220, the community scoring module 230 updates the communities for the customer accounts based on the new financial information, and extracts an updated set of features. The community scoring module 230 then compares the baseline set of features to the updated set of features to determine whether there is an increased risk of fraud associated with a community as further described below. As further described below, in some embodiments, the community scoring module 230 identifies three specific factors in comparing the baseline set of features to the updated set of features to predict an increase in a fraud level of a community. In an embodiment, the three factors are whether there are significant structural changes in a community (e.g., more parties becoming part of the community, or more parties having SARs filed against them), the rate at which change is happening (time factor) (e.g., rapid changes may be an indicator of fraudulent behavior), and any increase in transaction values (average) for a community. In some embodiments, other features, such as number of members in a community, transaction valuation of the community, transaction frequency of the community, total number of SAR filings for the community, etc. may be used. Accordingly, the disclosed embodiments leverage analytics that focuses on the nature and extent of the change in community makeup and behavior, rather than analyzing potential fraud indicators directly, or using standard trend analysis on those elements.

In some embodiments, the community scoring module 230 is configured to generate a fraud score indicating a confidence level of suspected fraud. For example, a fraud score of 90 can indicate that there is a 90% likelihood that fraud is occurring within the community. In some embodiments, the community scoring module 230 may alter a previously generated fraud score based on new financial data.

In some embodiments, the fraud analysis system 200 uses a fraud analysis machine learning model 250 in determining if there is an increased risk of financial fraud associated with a community. Machine learning model 250 is a mathematical model created using a machine learning algorithm and training dataset. For example, in some embodiments, the machine learning algorithm can be configured to analyze features generated from real financial data related to customer accounts and/or communities that have been proven to be associated with financial fraud. Once the machine learning algorithm processes and analyzes the features (e.g., by identifying patterns in the training data), it outputs a model that can be applied to new party/account data to predict fraud. As further described below, in some embodiments, the machine learning model 250 can then be used to compare and analyze new financial data associated with customer accounts and/or communities to determine the likelihood of financial fraud for the customer accounts and/or communities. The machine learning model 250 can be updated with new training data over time. For example, if the results of the machine learning model 250 indicating a likelihood of financial fraud for the customer accounts and/or communities is proven true after being investigated, this information can be fed back into the machine learning algorithm as training data for updating the machine learning model 250 to make it even more accurate in its prediction.

Figure 3:
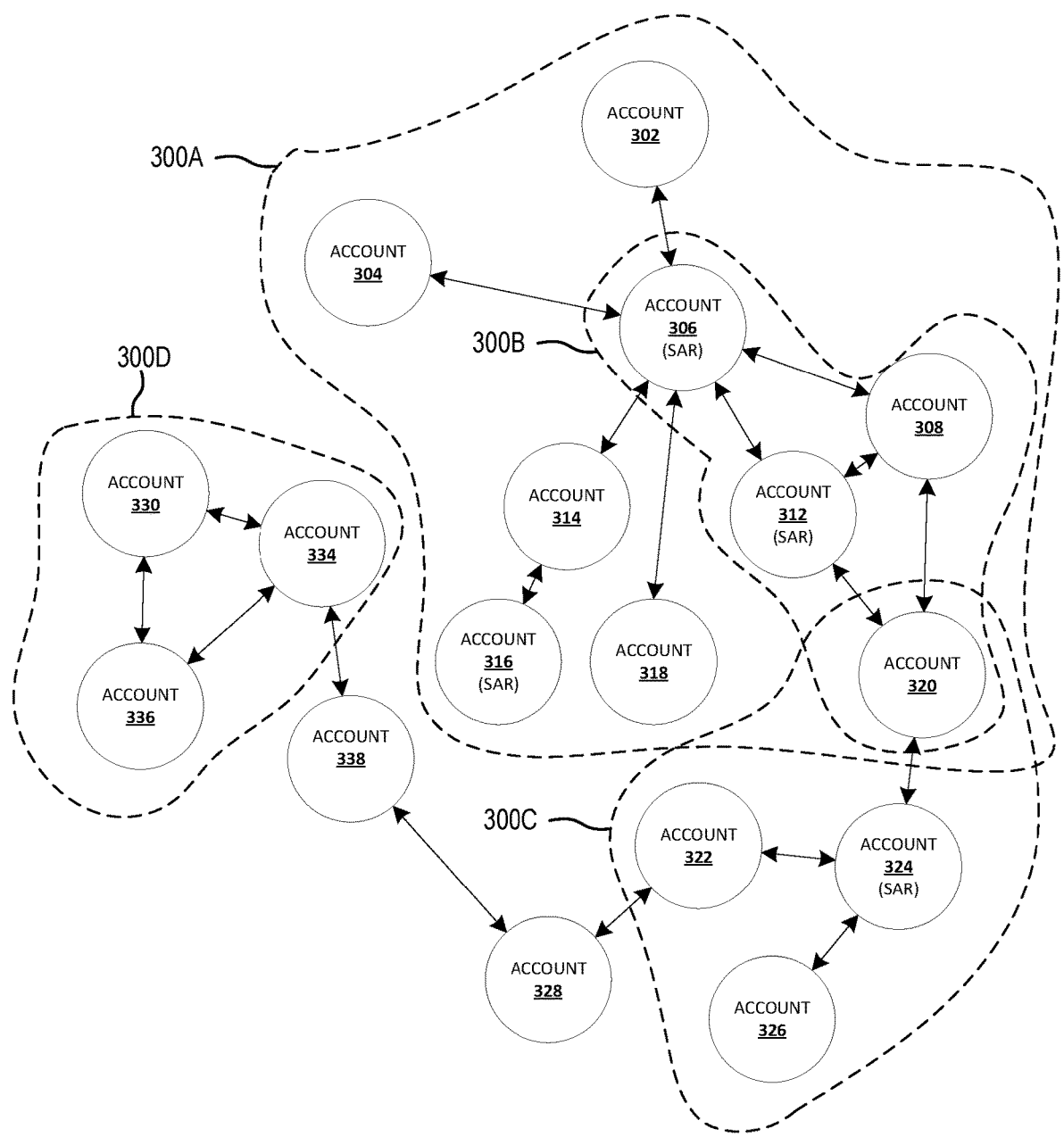
FIG. 3 is a schematic diagram illustrating communities of customer accounts in accordance with an embodiment of the present disclosure.

FIG. 3 is a schematic diagram illustrating communities of customer accounts in accordance with an embodiment of the present disclosure. In some embodiments, the communities can be created using the community creation module 210 of the fraud analysis system 200 described in FIG. 2.

In the depicted embodiment, four communities 300A-300D are depicted for illustration purposes. In accordance with the disclosed embodiments, a community may include any number of customer accounts and may be established for various reasons. For example, community 300A is a community established around customer account 306, which has a SAR associated with it. Community 300A includes customer accounts that are one or two hops or connections away from customer account 306. Community 300A includes account 302, account 304, account 306, account 308, account 312, account 314, account 316, account 318, and account 320. A customer account may be connected to another customer account for various reasons including, but not limited to, X number of transactions performed between accounts, frequency of transactions between accounts, total dollar amount of transactions between accounts, and relationship of ownership of accounts (e.g., accounts between family members, related businesses, accounts having the same addresses, phone numbers, Internet Protocol (IP) address, contact information, etc.). A community may encompass one or more other smaller communities or one or more customer accounts in other communities. For example, in the depicted embodiment, community 300A includes community 300B, which includes account 306, account 308, account 312, and account 320. Similarly, a customer account may belong to multiple communities. For example, customer account 320 is a member of community 300A, community 300B, and community 300C, which includes account 320, account 322, account 324, and account 326. As stated above, a community can be established based on any number of reason or relationship between customer accounts. A community may or may not include customer accounts that have suspicious activity reports associated with it, but may be established for monitoring purposes based on other suspicious financial activity. For example, community 300D can comprise of customer accounts 330, 334, and 336, which were established using the same mailing address for different named corporations, but have no current suspicious activity reports associated with it. In the depicted embodiment, account 328 and 338 are not included in any of the four communities 300A-300D.

Figure 4:
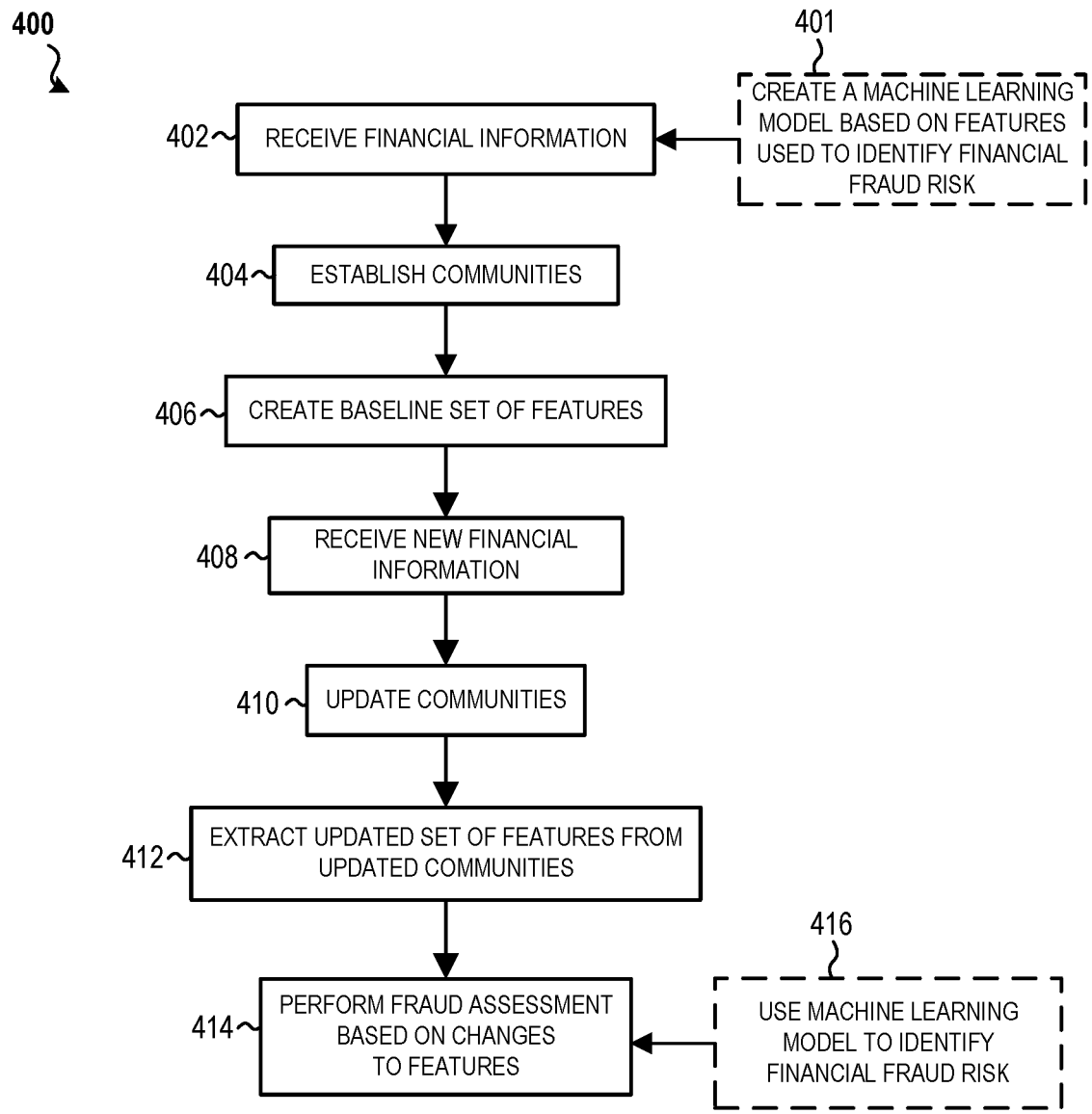
FIG. 4 is a flowchart illustrating a process for performing financial fraud assessment in accordance with an embodiment of the present disclosure.

FIG. 4 is a flowchart illustrating a process 400 for performing financial fraud assessment in accordance with an embodiment of the present disclosure. The process 400 may be performed by a fraud analysis system such as the fraud analysis system 200 described in FIG. 1 and FIG. 2. The process 400 begins, at step 402, by receiving financial information associated with customer accounts. The financial information can be received from one or more financial institution data systems as shown in FIG. 1 and as described in FIG. 2. The financial information associated with customer accounts can include account holder information (e.g., name of owner(s) of account, authorized users of the account, address information). The financial information associated with customer accounts can also include IP addresses used to access the account or set up the account, and physical locations where account is established or accessed. Additionally, the financial information associated with customer accounts can also include balances, financial transactions, and any SARs associated with a customer account.

At step 404, the process 400 establishes communities for the customer accounts as illustrated in FIG. 3. The process 400 can establish communities based on one more set of factors or rules as described above. For example, the rules for establishing a community can be based on X number of transactions performed between accounts, frequency of transactions between accounts, total dollar amount of transactions between accounts, and common attributes of customer accounts, accounts associated with one or more SARs, or any other relevant factors.

At step 406, the process 400 creates a baseline set of features for each of the communities by extracting various features from the communities as described in FIG. 2. After an initial baseline set of features for each of the communities is established, the process 400, at step 408, receives new financial information associated with customer accounts. As described above, the new financial information associated with customer accounts can be received during a scheduled period, when new financial information associated with customer accounts becomes available, when requested, or at any other time.

At step 410, the process 400 updates the communities for the customer accounts based on the new financial information. In various embodiments, updating the communities can include adding or removing one or more customer accounts to/from a community; adding, removing, or updating account information (e.g., physical/mailing address, IP addresses, and contact information); updating transactions frequency, amounts, SAR information associated with one or more customer accounts in a community; or updating any other information associated with a community.

Once the communities have been updated, the process 400, at step 412, extracts an updated set of features for each of the communities. The updated set of features can include the same type or category of information contained in the baseline set of features. In some embodiments, the updated set of features can include additional types or categories of information that was not included in the baseline set of features.

At step 414, the process 400 performs fraud assessment by determining whether a change between the updated set of features and the baseline set of features for each of the communities is indicative of an increased risk of fraud. In an embodiment, the rules for determining whether a change between the updated set of features and the baseline set of features for each of the communities is indicative of an increased risk of fraud can vary and be set by an administrator of the fraud analysis system or by a financial institution. For example, in some embodiments, if an increase in SARs associated with a community exceeds a predetermined value (i.e., a maximum number of SARs per community), the process 400 can identify that community as indicative of fraud. In some embodiments, if a rate of increase in SARs associated with a community exceeds a predetermined rate threshold for a given period (e.g., if community exceeds a 33% increase in the number of SARs within a month), the process 400 can identify that community as indicative of fraud. The increase in SARs associated with a community or rate of increase in SARs associated with a community can be based on the existing community members and/or based on adding new members associated with a SAR to a community during the update. In some embodiments, if a rate of increase in customer accounts associated with a community (i.e., the size of a community) exceeds a predetermined rate threshold for a given period (e.g., if community growth exceeds a 50% increase within a month), the process 400 can identify that community as indicative of fraud. In some embodiments, a frequency rate of change (i.e., how often, or how fast a change occurs) for a community can be set as a rule for indicating an increased risk of fraud. For instance, if a rapid change occurs within a community (e.g., 2 new SARs added within 24 hrs or 10 new customer accounts added within 72 hrs.), the process 400 can identify that community as indicative of fraud. In some embodiments, a rate of increase in transaction value (e.g., average transaction value increase by 200%), frequency of transactions (e.g., X number of transactions within Y number of hours), or total number of transactions, can be set as a rule for indicating an increased risk of fraud.

In some embodiments, step 414 is performed using a machine learning model to determine if there is an increased risk of fraud based on the updated set of the features and the baseline set of the features for each of the communities. For example, in some embodiments, a machine learning model is created based on features used to identify financial fraud risk at step 401. The machine learning model can be trained using real data to identify increased level of fraud risk (e.g., using financial data associated with customer accounts/communities that had previously been confirmed to be involved in fraudulent activities). Once the machine learning model has been trained, the process 400, at step 416, can apply the machine learning model to identify whether changes (e.g., total amount of change, frequency of change (i.e., how often), or rate of change (i.e., how fast)) between the baseline set of the features and the updated set of the features for each of the communities increases or decreases a risk of fraud for a customer account or community. By using the machine learning model instead of predefined rules or thresholds, the factors and thresholds in making the determination of whether there is an increase or decrease risk of fraud can be dynamically altered by the machine learning model, without user intervention, as additional data is analyzed/applied to the machine learning model. This enables the latest data to be utilized to provide a more accurate analysis of financial fraud.

In some embodiments, based on the above determination of whether there is an increased risk of fraud, the disclosed embodiments can modify a fraud indicator (e.g., a fraud score, flag, and/or report) associated with a customer account or a community. For instance, in some embodiments, if a fraud score has been provided (e.g., from a financial institution) or previously associated with a customer account or a community, the disclosed embodiments can modify/update the fraud score (e.g., up or down). In some embodiments, the disclosed embodiments can generate a secondary fraud score or indicator to supplement the first fraud indicator. In some embodiments, this secondary score can be used to further prioritize fraud investigation of the customer accounts.

Figure 5:
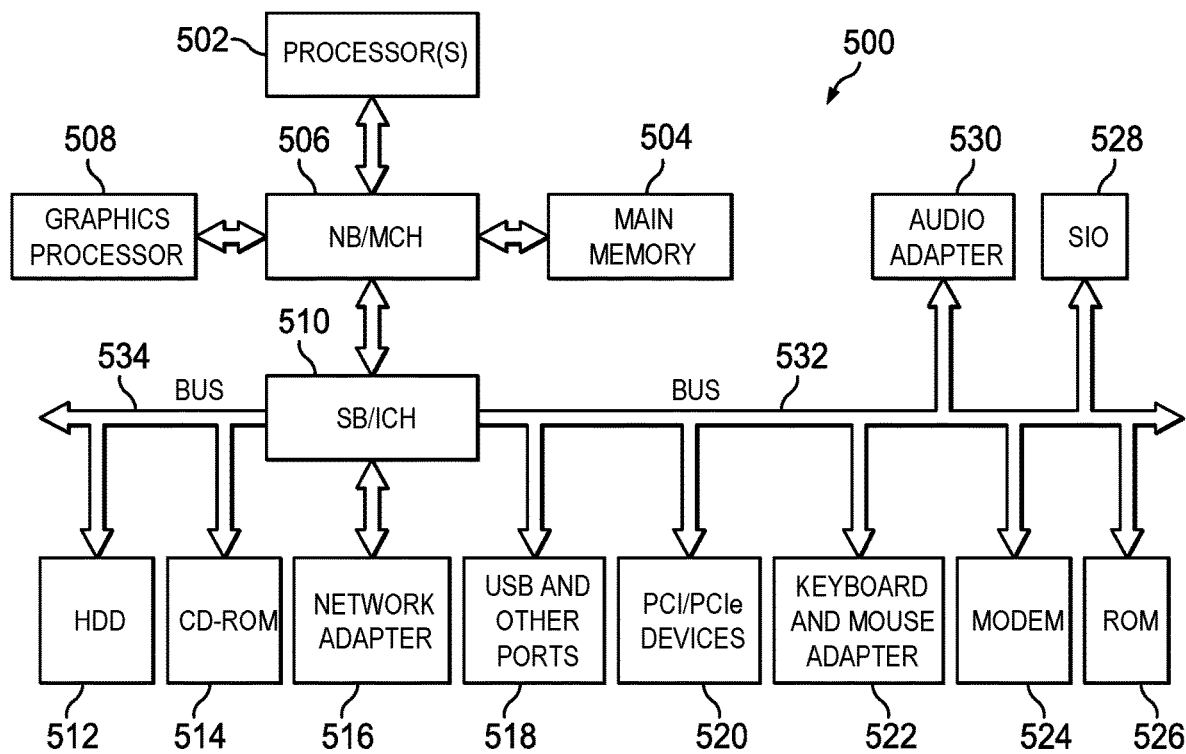
FIG. 5 is a block diagram illustrating a hardware architecture of a system according to an embodiment of the present disclosure.

FIG. 5 is a block diagram illustrating a hardware architecture of a system 500 according to an embodiment of the present disclosure in which aspects of the illustrative embodiments may be implemented. For example, in one embodiment, the fraud analysis system 200 of FIG. 1 and FIG. 2 may be implemented using the data processing system 500. Additionally, the data processing system 500 may be configured to store and execute instructions for performing the process described in FIG. 4. In the depicted example, the data processing system 500 employs a hub architecture including north bridge and memory controller hub (NB/MCH) 506 and south bridge and input/output (I/O) controller hub (SB/ICH) 510. Processor(s) 502, main memory 504, and graphics processor 508 are connected to NB/MCH 506. Graphics processor 508 may be connected to NB/MCH 506 through an accelerated graphics port (AGP). A computer bus, such as bus 532 or bus 534, may be implemented using any type of communication fabric or architecture that provides for a transfer of data between different components or devices attached to the fabric or architecture.

In the depicted example, network adapter 516 connects to SB/ICH 510. Audio adapter 530, keyboard and mouse adapter 522, modem 524, read-only memory (ROM) 526, hard disk drive (HDD) 512, compact disk read-only memory (CD-ROM) drive 514, universal serial bus (USB) ports and other communication ports 518, and peripheral component interconnect/peripheral component interconnect express (PCI/PCIe) devices 520 connect to SB/ICH 510 through bus 532 and bus 534. PCI/PCIe devices 520 may include, for example, Ethernet adapters, add-in cards, and personal computing (PC) cards for notebook computers. PCI uses a card bus controller, while PCIe does not. ROM 526 may be, for example, a flash basic input/output system (BIOS). Modem 524 or network adapter 516 may be used to transmit and receive data over a network.

HDD 512 and CD-ROM drive 514 connect to SB/ICH 510 through bus 534. HDD 512 and CD-ROM drive 514 may use, for example, an integrated drive electronics (IDE) or serial advanced technology attachment (SATA) interface. In some embodiments, HDD 512 may be replaced by other forms of data storage devices including, but not limited to, solid-state drives (SSDs). A super I/O (SIO) device 528 may be connected to SB/ICH 510. SIO device 528 may be a chip on the motherboard that is configured to assist in performing less demanding controller functions for the SB/ICH 510 such as controlling a printer port, controlling a fan, and/or controlling the small light emitting diodes (LEDS) of the data processing system 500.

The data processing system 500 may include a single processor 502 or may include a plurality of processors 502. Additionally, processor(s) 502 may have multiple cores. For example, in one embodiment, data processing system 500 may employ a large number of processors 502 that include hundreds or thousands of processor cores. In some embodiments, the processors 502 may be configured to perform a set of coordinated computations in parallel.

An operating system is executed on the data processing system 500 using the processor(s) 502. The operating system coordinates and provides control of various components within the data processing system 500 in FIG. 5. Various applications and services may run in conjunction with the operating system. Instructions for the operating system, applications, and other data are located on storage devices, such as one or more HDD 512, and may be loaded into main memory 504 for execution by processor(s) 502. In some embodiments, additional instructions or data may be stored on one or more external devices. The processes described herein for the illustrative embodiments may be performed by processor(s) 502 using computer usable program code, which may be located in a memory such as, for example, main memory 504, ROM 526, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying financial fraud risk, the method comprising:
   receiving a training dataset that includes financial data that have been proven to be associated with financial fraud;
   training a machine learning model based on an analysis of features from the training dataset to identify patterns in the financial data that have been proven to be associated with financial fraud;
   receiving financial information associated with customer accounts;
   establishing communities for the customer accounts;
   creating a baseline set of the features for each of the communities, wherein the baseline set of the features comprises a first total dollar amount of all transactions between all the customer accounts in the community;
   receiving new financial information associated with the customer accounts;
   updating the communities for the customer accounts based on the new financial information;
   extracting an updated set of the features for each of the communities, wherein the updated set of the features comprises a second total dollar amount of all transactions between all the customer accounts in the community; and
   determining a difference between the baseline set of the features and the updated set of the features for each of the communities;
   performing, by the machine learning model, a financial fraud risk assessment for each of the communities to identify one or more communities that have an increased risk of financial fraud by determining whether the difference between the baseline set of the features and the updated set of the features for each of the communities is indicative of an increased risk of fraud based on the patterns identified in the financial data that have been proven to be associated with financial fraud during training of the machine learning model, wherein there is an increased risk of financial fraud for the community when a difference in the second total dollar amount and the first total dollar amount for the community exceeds a threshold determined by the machine learning model that is indicative increased risk of financial fraud for the community; and
   retraining the machine learning model based on an accuracy determination of the financial fraud risk assessment performed by the machine learning model to improve future financial fraud predictions by the machine learning model.

2. The method of claim 1, wherein the features include a community size feature indicating a number of customer accounts within a community.

3. The method of claim 2, wherein the features include a community structure feature indicating a structure of the community.

4. The method of claim 3, wherein the features include a suspicious activity report (SAR) feature indicating a number of customer accounts within the community that are associated with a SAR.

5. The method of claim 4, wherein the features include a transaction feature indicating financial transaction information associated with the customer accounts in the community.

6. The method of claim 5, wherein the machine learning model uses a plurality of factors in determining financial fraud risk including a total increase in a number of SARs associated with a community.

7. The method of claim 6, wherein the plurality of factors in determining financial fraud risk includes a rate of change in the number of SARs associated with a community.

8. The method of claim 7, wherein the plurality of factors in determining financial fraud risk including a rate of change in the structure of the community.

9. The method of claim 8, further comprising updating the machine learning model with new training data based on the determination of financial fraud risk performed using the machine learning model that have been proven to be accurate in identifying financial fraud.

10. A system configured to perform financial fraud assessment, the system comprising memory for storing instructions, and a processor configured to execute the instructions to:
    receive a training dataset that includes financial data that have been proven to be associated with financial fraud;
    train a machine learning model based on an analysis of features from the training dataset to identify patterns in the financial data that have been proven to be associated with financial fraud;
    receive financial information associated with customer accounts;
    establish communities for the customer accounts;
    create a baseline set of the features for each of the communities, wherein the baseline set of the features comprises a first total dollar amount of all transactions between all the customer accounts in the community;
    receive new financial information associated with the customer accounts;
    update the communities for the customer accounts based on the new financial information;
    extract an updated set of the features for each of the communities, wherein the updated set of the features comprises a second total dollar amount of all transactions between all the customer accounts in the community;
    determine a difference between the baseline set of the features and the updated set of the features for each of the communities; and
    perform, by the machine learning model, a financial fraud risk assessment for each of the communities to identify one or more communities that have an increased risk of financial fraud by determining whether the difference between the baseline set of the features and the updated set of the features for each of the communities is indicative of an increased risk of fraud based on the patterns identified in the financial data that have been proven to be associated with financial fraud during training of the machine learning model, wherein there is an increased risk of financial fraud for the community when a difference in the second total dollar amount and the first total dollar amount for the community exceeds a threshold determined by the machine learning model that is indicative increased risk of financial fraud for the community; and retrain the machine learning model based on an accuracy determination of the financial fraud risk assessment performed by the machine learning model to improve future financial fraud predictions by the machine learning model.

11. The system of claim 10, wherein the features include a community size feature indicating a number of customer accounts within a community.

12. The system of claim 11, wherein the features include a suspicious activity report (SAR) feature indicating a number of customer accounts within the community that are associated with a SAR.

13. The system of claim 11, wherein the features include a transaction feature indicating financial transaction information associated with the customer accounts in the community.

14. The system of claim 13, wherein the machine learning model uses a plurality of factors in determining financial fraud risk including a total increase in a number of suspicious activity reports (SARs) associated with a community.

15. The system of claim 14, wherein the plurality of factors in determining financial fraud risk includes a rate of change in the number of SARs associated with a community.

16. The system of claim 15, wherein the plurality of factors in determining financial fraud risk including a rate of change in a structure of the community.

17. A computer program product for performing financial fraud assessment, the computer program product comprising a computer readable storage medium having program instructions embodied therewith, the program instructions executable by a processor to cause the processor to:

receive a training dataset that includes financial data that have been proven to be associated with financial fraud;

train a machine learning model based on an analysis of features from the training dataset to identify patterns in the financial data that have been proven to be associated with financial fraud;

receive financial information associated with customer accounts;

establish communities for the customer accounts;

create a baseline set of the features for each of the communities, wherein the baseline set of the features comprises a first total dollar amount of all transactions between all the customer accounts in the community;

receive new financial information associated with the customer accounts;

update the communities for the customer accounts based on the new financial information;

extract an updated set of the features for each of the communities, wherein the updated set of the features comprises a second total dollar amount of all transactions between all the customer accounts in the community; and determine a difference between the baseline set of the features and the updated set of the features for each of the communities; and perform, by the machine learning model, a financial fraud risk assessment for each of the communities to identify one or more communities that have an increased risk of financial fraud by determining whether the difference between the baseline set of the features and the updated set of the features for each of the communities is indicative of an increased risk of fraud based on the patterns identified in the financial data that have been proven to be associated with financial fraud during training of the machine learning model, wherein there is an increased risk of financial fraud for the community when a difference in the second total dollar amount and the first total dollar amount for the community exceeds a threshold determined by the machine learning model that is indicative increased risk of financial fraud for the community; and retrain the machine learning model based on an accuracy determination of the financial fraud risk assessment performed by the machine learning model to improve future financial fraud predictions by the machine learning model.

18. The computer program product of claim 17, wherein the features include a community size feature indicating a number of customer accounts within a community, a suspicious activity report (SAR) feature indicating a number of customer accounts within the community that are associated with a SAR, and a transaction feature indicating financial transaction information associated with the customer accounts in the community.

19. The computer program product of claim 18, wherein the machine learning model uses a plurality of factors in determining financial fraud risk including a total increase in a number of SARs associated with a community, a rate of change in the number of SARs associated with a community, and a rate of change in a structure of the community.

20. The computer program product of claim 18, wherein the machine learning model is updated with new training data based on the determination of financial fraud risk performed using the machine learning model that have been proven to be accurate in identifying financial fraud.

* * * * *